INVENTOR.
HAROLD D. DICKSTEIN
BY George Lipkin
George Z. Pearson
ATTORNEYS

March 11, 1958 H. D. DICKSTEIN 2,826,252

AUTOMATIC SHAFT POSITION DATA ENCODER

Filed Jan. 12, 1955 4 Sheets-Sheet 2

INVENTOR.
HAROLD D. DICKSTEIN
BY
George E. Pearson
ATTORNEYS

AUTOMATIC SHAFT POSITION DATA ENCODER

Filed Jan. 12, 1955 4 Sheets-Sheet 4

INVENTOR.
HAROLD D. DICKSTEIN
BY George Sipkin
George E. Pearson
ATTORNEYS 2,826,252

AUTOMATIC SHAFT POSITION DATA ENCODER

Harold D. Dickstein, San Diego, Calif.

Application January 12, 1955, Serial No. 481,498

8 Claims. (Cl. 164—115)

Figure 1:
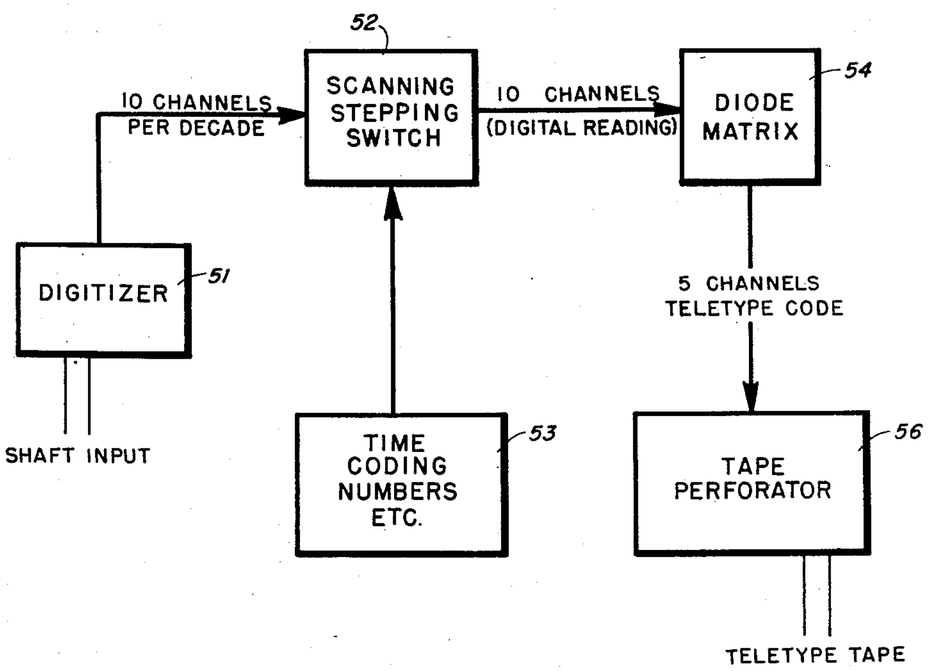

(Granted under Title 35, U. S. Code (1952), sec. 266)

The invention described herein may be manufactured and used by or for the Government of the United States of America for governmental purposes without the payment of any royalties thereon or therefor.

This invention relates to an automatic shaft position data encoder and more particularly to a unit for converting shaft position data onto Teletype tape which may be transferred later to punched cards. The reading equipment is almost independent of the servo shaft it is reading and is completely portable.

In recent years, the increasing complexity of electronic equipment and systems has produced a great need for methods of automatic data reduction. Teletype tape-to-card punches are in use which enables data on Teletype tape to be converted to data on punched cards normally used in IBM computations. The collection of data on Teletype tape offers three distinct advantages: (1) It can store a large amount of data in a much more compact form than that provided by punched cards. (2) Tape is light and presents no problems in "field operations." It eliminates the problem of supplying cards to distant points of operation. (3) Tape permits data to be taken and recorded automatically with a unit much smaller than anything now available in the automatic data reduction field.

Although this Teletype system of collecting data on tape offers these advantages, equipment and methods for this process are lacking. Many companies have equipment which will convert data to Teletype tape but all are quite large and electronically complicated. Naturally most of these equipments will perform with a great deal of versatility and can be used to take data in extremely short intervals of time (some approach an interval of 50 milliseconds or less). However, these equipments are expensive (in the order of $20,000), and could never be portable or lend themselves to field operations. If it is desired to take a data reading at intervals of 5 or more seconds and if it is possible to hold the system still for approximately 2 seconds in order to take a reading, it is possible to design equipment of light weight and small size which will convert the data to Teletype tape. However, at the present time, there are apparently no such units available commercially. Hence, the need existed for the equipment embraced by this invention.

The automatic shaft position data encoder (hereinafter referred to as ASPDE) employing the principles of the present invention comprises a unit that is completely electro-mechanical, consisting of relays, stepping switches, germanium diodes, selenium power supply, tape perforator, and a shaft-position-to-digital transducer, hereinafter referred to as a "digitizer." No electronic tubes are used. This unit is designed to convert a shaft position to a digital quantity and then punch this reading on Teletype for future use with the tape-to-card punch and is especially well suited for field operation since the equipment is very small, light, and portable, being 17 x 12 x 10 inches in size and weighing approximately 60 pounds. It eliminates the need of punch cards at the reading site. The data on the Teletype tape requires very small space for storage and yet can be converted into punched cards easily and the data can be listed on any teleprinter. The reading sequence is completely automatic. In most cases the data output will be in the form of a shaft position, but if the original data is a voltage or temperature reading, it can be converted by appropriate servomechanism circuits to a shaft position and thus the ASPDE can be applied to many data problems.

An object of the present invention is the provision of an improved automatic shaft position data encoder.

Another object is the provision of an electro-mechanical unit which will read the position of a rotating shaft, convert this shaft position to a digital quantity, and then punch this digital indication on Teletype tape along with other code or identification information for later transfer to punch cards.

Another object is the provision of a light, compact and portable automatic shaft position data encoder for use in field operations, and which will eliminate the use of punch cards at the reading site.

Other objects and many of the attendant advantages of this invention will be readily appreciated as the same becomes better understood by reference to the following detailed description when considered in connection with the accompanying drawings wherein:

Fig. 1 is a simplified block diagram of the present invention; and

Figure 2A:
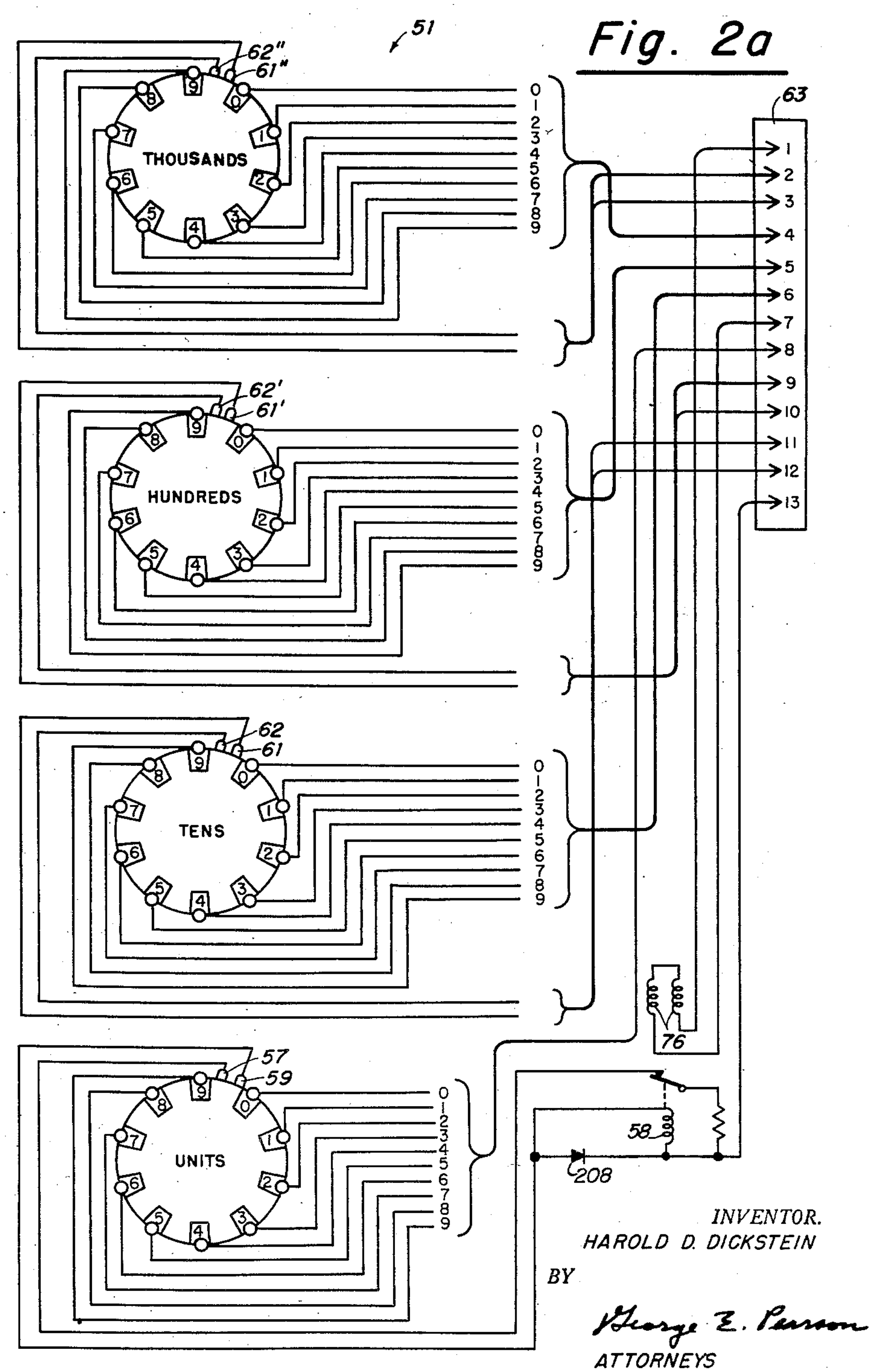
Figure 2B:
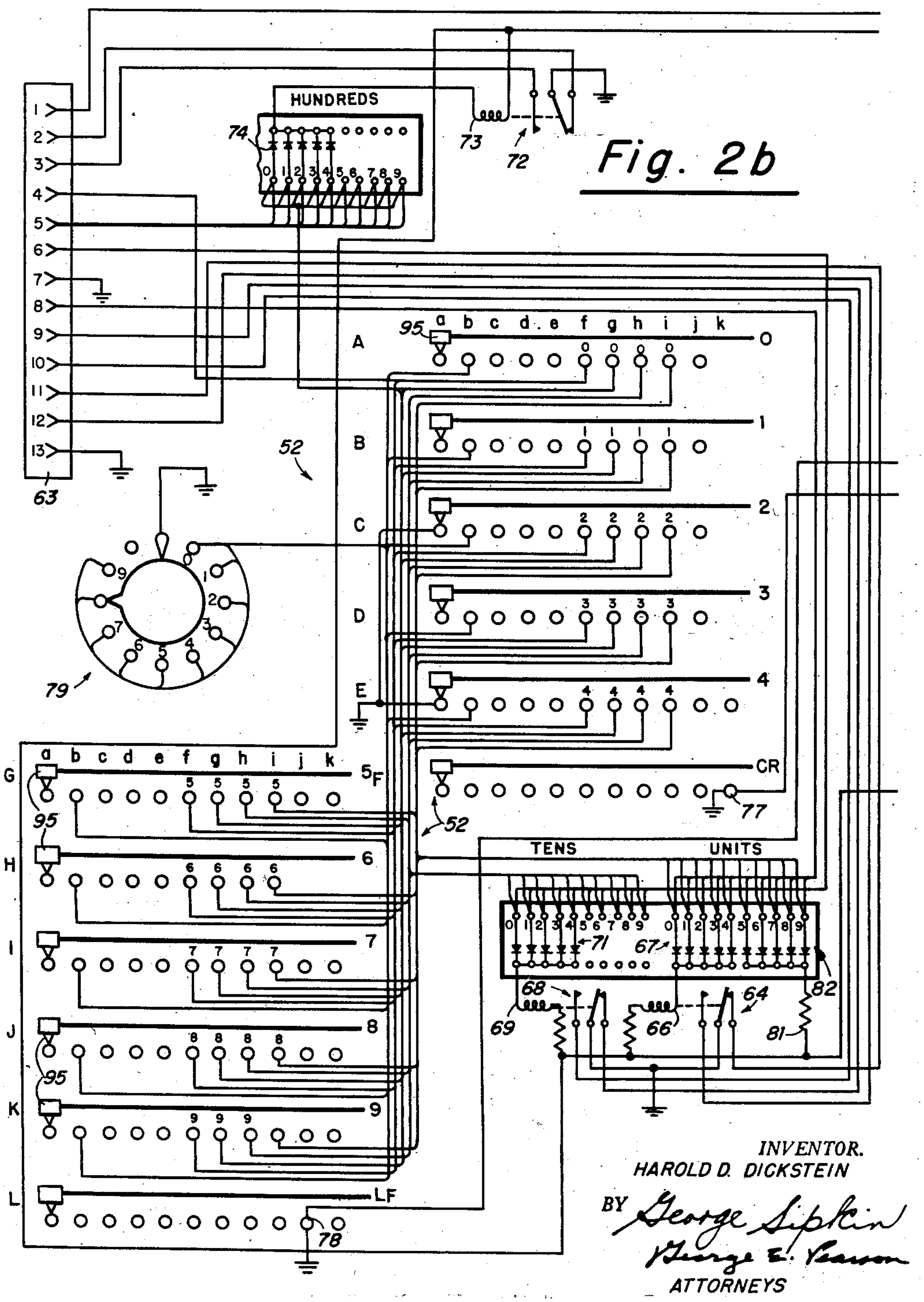
Figure 2C:
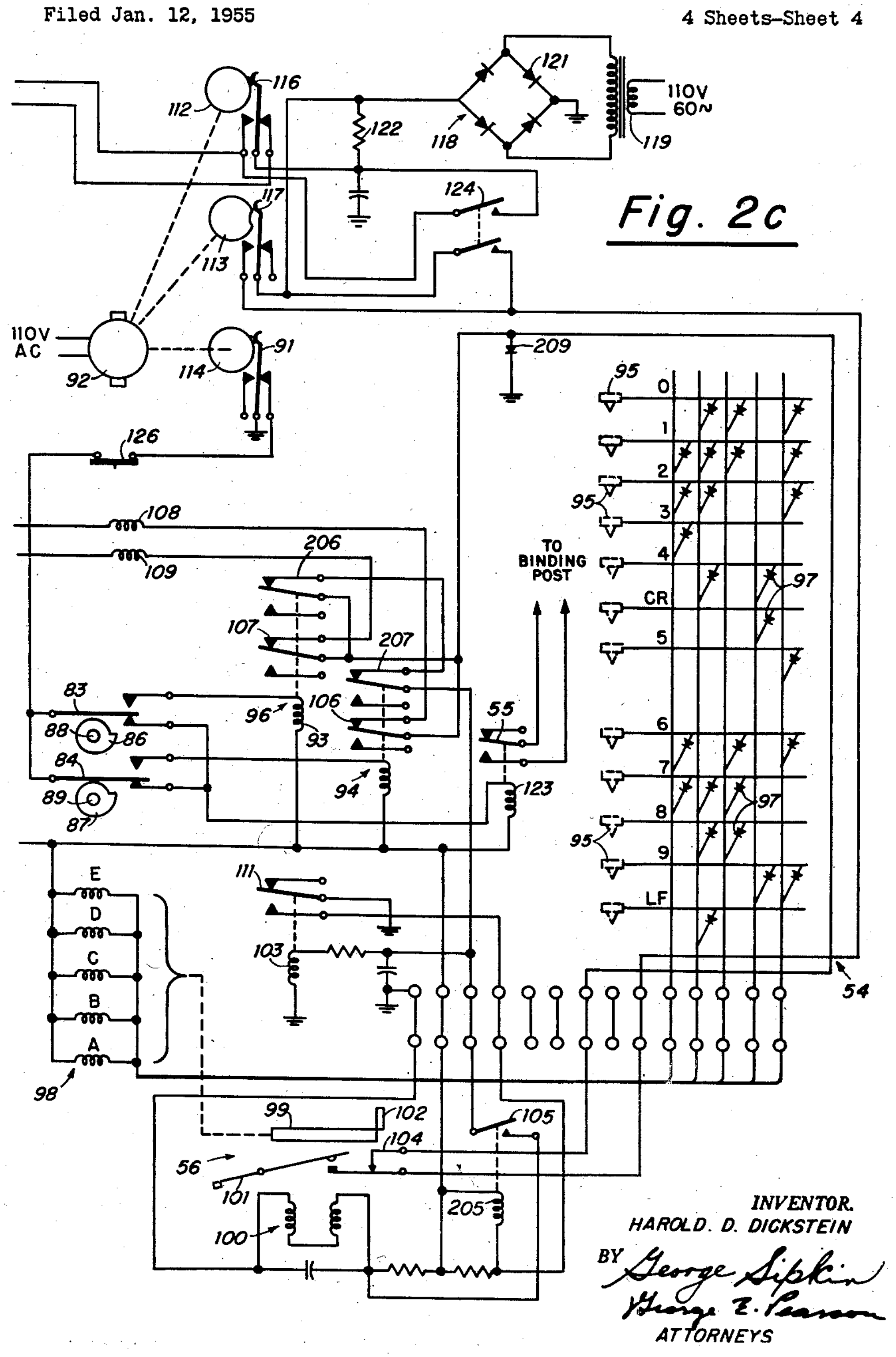

Fig. 2A, 2B, and 2C taken together form a schematic view of the apparatus.

Referring now to the drawings wherein like reference characters designate like or corresponding parts throughout the several views, there is shown in Fig. 1 the system comprising a shaft-position-to-digital-code transducer, or "digitizer" 51, a master scanning switch 52, code and timing switches 53, a diode matrix 54, and a Teletype tape perforator 56. The actual read out of any information is made in digital form by "digitizer" 51, scanned in the proper sequence at 52, and then converted to the Teletype code. This conversion is made possible by use of the diode matrix 54, a circuit arrangement used extensively in computer circuits. By using this system it is possible to utilize a commerically available transducer to read the shaft position. It also enables the use of small readily available components to obtain time and code numbers in a digital form.

The transducer, or "digitizer" 51, is attached directly to the shaft being checked. Its output consists of 40 separate circuits, ten circuits per decade. Each individual circuit represents a different number for its respective decade. Depending upon the shaft position, one circuit for each decade will be connected to ground, while all the other circuits will be open. For example, if the shaft position is 642.1 revolutions from its arbitrary zero set where the "digitizer" reads 000.0, the number brought out of the "digitizer" will be 6421 and will be indicated by having the sixth circuit in the thousands decade, the fourth circuit in the hundreds decade, the second circuit in the tens decade, and the first circuit in the ones decade connected to ground. The "digitizer" will give an unambiguous reading regardless of its position. In other words, there will always be one, and only one, circuit per decade connected to ground regardless of the shaft position. This feature eliminates the need for any type of positioning circuit in the servo system and makes the ASPDE almost independent of the system being read.

However, it is necessary to prevent the movement of the shaft when a reading is being made because of the one second required for the ASPDE to scan through a complete reading and therefore it is necessary to provide some means to stop the servo system when a shaft position reading is taken. In the present application this is done by energizing a relay 123 which grounds the servo amplifier grid input. In order to provide a relay control two binding posts are located on the rear panel of the ASPDE. These binding posts provide a normally open circuit which is closed by relay switch 55 when the ASPDE begins a reading and opens immediately after the shaft position reading has been made. In order to make the unambiguous reading feature possible, the design of the "digitizer" incorporates several design features which make necessary external circuitry in the form of relays and germanium diodes, which are mounted in the ASPDE.

The actual design of the "digitizer" consists of several sets of two brushes geared to the input shaft. The units decade brushes are directly connected to the input shafts and the other decades brushes are geared to the input shaft in their proper ratios. These brushes ride over Micarta discs embedded with ten segments in the proper positions. Each of these segments is connected to its respective circuit which is lead out to the external Cannon plug. The two brush system makes possible the unambiguous reading feature of the "digitizer." The brushes are positioned respective to one another in such a way that one brush will never touch two segments at once and one or the other brush will be connected to a segment at all times. The choice of which brush will read is dependent upon the reading of the next least significant decade. In the units decade, one brush is the control brush 59. It will read as long as it is connected to a segment. When it is not on a segment, a relay 58 in series with this brush is de-energized and the slave brush 57 is therefore connected. The two brushes (lead 61, 61′, 61″ and lag 62, 62′, 62″) for the other decades are brought out to the external Cannon plug 63. The leads from each two brushes are brought to the individual contacts of a single pole double throw relay whose coil is connected in series with germanium diodes to the segments zero through four of the next least significant decade. As shown in Fig. 2A and Fig. 2B lag and lead brushes 62, 61 in the tens decade are connected to relay 64 whose coil 66 is in series with diodes 67 and is connected to the segments zero through four of the units decades. Lag and lead brushes 62′, 61′ in the hundreds decade are connected to relay 68 whose coil 69 is in series with diodes 71 and is connected to the segments zero through four of the tens decade. Similarly, lag and lead brushes 62″, 61″ in the thousands decade are connected to relay 72 whose coil 73 is in series with diodes 74 and is connected to the segments zero through four of the hundreds decade. The diodes 67, 71, and 74 are for isolation of the individual circuits. With this arrangement, one brush of the decade will read if a number from zero to four in the next least significant decade is connected to ground, whereas the other brush will read if a number from five to nine is connected. The discs on the shaft (not shown) containing the segments, and the brushes are separated physically when not reading by energizing solenoids 76 contained in the "digitizer." When a reading is to be made these solenoids are de-energized and the discs move forward and contact the brushes.

The individual circuit leads from the "digitizer" are brought out from the "digitizer" through the Cannon plug 63 to terminal boards within the ASPDE. Each circuit is brought to a separate tie point and then is connected to the scanning switch. The scanning switch in the present model consists of two six bank, ten position stepping switches operated together to produce a total of twelve banks. Each bank represents a digit. Thus bank one represents the number zero (top horizontal row A), and any time that it is connected to ground at a position *a* to *k*, the Teletype code number for zero will be punched on the Teletype tape as the scanning switch reaches that position. The sixth and twelfth banks F and L of the stepping switch 52 are wired at points 77, 78 so that any time they are ground they will produce the Teletype symbols for "carriage return" and "line feed" respectively. The first position (left vertical column *a*) on the stepping switch is wired permanetly so that banks two and four (C and E) are always connected to ground. A combination of the Teletype symbols for two and four produces the symbol for "figure shift." Thus when the scanning switch reaches the first position *a*, the "figure shift" symbol will be punched on the tape. This insures that any Teletype equipment utilizing the Teletype tape will remain in "figure shift" for each individual piece of data. The next position (second left vertical column *b*) of the stepping switch has each individual number bank connected to one contact of a single pole twelve position rotary switch 79. The common contact of this switch is connected to ground and the operation of this switch is manual. Its position is indicated by a dial on the front panel of the assembled unit. This enables an operator to select any code number for identifying the particular data "run" being made. The number selected by the rotary switch is the second figure punched on the Teletype tape. The next three positions of the scanning switch are not connected in the present model but are intended for future automatic recording of the time or data count and circuits to accomplish this, to be later described as a modification to the preferred embodiment. The sixth position *f* on the stepping switch is connected to the thousands decade of the shaft position read by the "digitizer." Each individual circuit is taken from the tie point on the terminal board within the ASPDE to its respective bank on position *f* of the scanning switch. Thus, the circuit corresponding to the number one segment of the thousands decade of the "digitizer" will be connected to the number one bank B of the position *f* of the scanning switch and each other number will be connected to its proper bank in the same manner as shown by the corresponding Cannon pin plug numbers in Figs. 2A and 2B. Therefore, if any number in the thousands decade is connected to ground by the position of the brushes in the "digitizer," the scanning switch upon reaching the sixth position *f* will see a ground on the bank corresponding to this number and by conversion in the diode matrix 54, the Teletype tape will be punched with the Teletype symbol corresponding to this number. The hundred decade is connected to the seventh position *g* of the scanning switch in exactly the same manner. The tens decade goes to the eighth position *h* and the units decade is fed to the ninth position *i*. Thus the scanning switch 52 will scan the decades in the proper order and the shaft position will be indicated on the Teletype tape in the form of a four digit number.

A group of relays 64, 68, 72 are connected to these "digitizer" circuits as explained before in order to choose the correct brush for reading. As shown in Fig. 2B, coil 66 in relay 64 is connected from a voltage source through germanium diodes 67 to the "digitizer" circuits, zero through four, on the units decade in Fig. 2A. The anodes of the diodes are all connected to the relay coil 66 but the cathode of each individual diode is connected to one of the "digitizer" circuits. The diodes isolate the individual circuits so that any one of them can be grounded without affecting the others. It is evident that if any circuit between zero and four in the units decade of the "digitizer" is grounded in the "digitizer," the coil 66 will be energized tripping switch 64 and the lead brush 61 on the tens decade will be connected to ground while the lag brush 62 will be floating. Therefore the lead brush 61 will be read by the scanning switch. If any number between five and nine is connected to ground on the units decade, coil 66 will be de-energized and the lag brush 62 on the tens decade is connected to ground and will read. The current from the diode matrix 54 is fed to the "digitizer" only when the scanning switch 52 is in the proper position to read the "digitizer" circuits.

Since the reading from one decade is dependent upon the reading of the previous decade as far as choice of brush is concerned, it is necessary to feed some current through the brush selection relays at all times during a reading sequence. Although only segments, zero through four, need by connected to the brush selection relays, to choose the proper brush in the tens, hundreds, and thousands decade, the control brush arrangement in the units decades requires a current of 150 milliamperes at all times, regardless of which segment is reading. Therefore another completely separate current feed circuit is fed through a dropping resistor 81, and diodes 82 to segments five through nine. Thus current is fed through the units decade regardless of the number being read, and operates the digitalizing relay 58 which selects the units brush for read out. Depending upon which segment of the units decade is being read, relay 64 selects the proper read out brush for the tens decade. Depending upon which segment of the tens decade is being read, relay 68 selects the read out brush for the hundreds decade. Similarly, relay 72 selects the read out brush for the thousands decade. After reading the "digitizer" output, the scanning switch 52 steps to the tenth position *j*. The twelfth bank L of the tenth position *j* of the stepping switch is connected directly to ground. This produces the symbol for "line feed" which is punched when the scanning switch reaches the tenth position *j*. When the scanning switch reaches the eleventh position *k* the Teletype symbol for "carriage return" is punched on the tape since the sixth bank F of the eleventh position *k* is connected to ground. The eleventh position *k* of the stepping switch is the normal resting position. An off normal switch (single pole-double throw) 83, 84 is mounted on each of the stepping switches and is operated by cams 86, 87 attached to the scanning arms 88, 89. These off normal switches 83, 84 are operated by these cams 86, 87 when the scanning switch 52 is in the eleventh position *k*. The common contact point of the off normal switches 83, 84 on both stepping switches is taken through a timing switch 91, operated by a clock motor 92, to ground. The normally open contact of the off normal switch 83 of the stepping switch containing banks, one (A) through six (F), is connected to relay 96. The normally open contact of the off normal switch 84 of the other stepping switch is connected to relay 94. Therefore relay 96 is energized whenever its associated stepping switch is in the eleventh position *k*. Whenever relay 96 is energized, the circuit feeding power to its associated stepping switch coil 109 is open and the stepping switch cannot be stepped off of the eleventh position *k*. In the same manner, relay 94 prevents further movement of its stepping switch. Thus the stepping switches will stop when they reach the eleventh position *k*, providing the circuit to ground from 94 and 96 through the timing switch 91 is connected. If the two stepping switches get out of step with each other they will still individually stop in the eleventh position *k* and will be in step on the next scan. The actual stepping pulses for the stepping switches come from the break contacts 104 mounted on the punch hammer 101 in the perforater 56. The stepping switches are therefore synchronized with the punching operation so that they are stepped forward only after the number indicated by the stepping switch position is punched in the tape. The action of the perforator will be explained in detail later.

The output of the scanning switches is fed to the diode matrix 54. The diode matrix is a relatively simple circuit which converts the digital output of the scanning switches to the five channel Teletype code. Each digital channel is connected to the correct group of Teletype channels through germanium diodes 97 which serve to isolate the individual channels. Several examples will serve to clarify the action of the matrix. The standard Teletype code for zero is space, mark, mark, space, mark.

Therefore it is seen that the second, third, and fifth channels of the Teletype perforator 56 should be energized so as to punch the tape. Therefore channels two, three, and five (reading from left to right to Fig. 2C) are connected through the germanium diodes 97 to the circuit for zero coming from the scanning switch wipers 95. Thus any time the scanning switch rests on a position where the zero bank A is grounded, channels two, three, and five will also be grounded through the diodes and the same channels in the perforator will be grounded. The punch bar magnets 98 which select the proper punching bars 99 will be energized and the tape will be punched with the Teletype code for the number zero. For the number one, the code is mark, mark, mark, space, mark. Therefore channels one, two, three, and five from the perforator 56 are connected to the number one channel in the matrix. Each number or character has its own Teletype code and this code can be produced by the proper connections in the matrix 54.

The perforator 56 used in the ASPDE is different from most Teletype perforators because of the fact that it is not motor driven but is completely magnetically operated. The voltage requirements are much less than other Teletype equipment and there is no special speed associated with the punching operation. It is much smaller than other Teletype equipment being of a size of 12" by 10" by 9". Since there are no speed requirements, such as the usual 60 words per minute, this perforator's speed can be controlled by the stepping rate of the scanning switch which eliminates many errors which were found to occur when a standard Teletype perforator was used and from necessity controlled the speed of the stepping switch. The perforator has five punch bars 99 which rest on the punch hammer 101. The punch hammer is a wide metal bar which is driven up by a punch hammer magnet 100. Each punch bar 99 has its own selection magnet 98 (A, B, C, D, or E) which, when energized, drives the punch bar forward over the punch hammer 101 until it rests under its respective code punch shaft 102. When the punch hammer magnet 100 is energized, the punch hammer 101 drives the punch bar 99 up so that it drives the code punch shaft 102 through the tape. If the selection magnet 98 is not energized, the punch bar 99 is not positioned under its code punch shaft 102 and therefore the code punch shaft will not be driven into the tape. As the punch hammer returns to its resting position, it strikes a ratchet wheel, not shown, which steps the tape forward. On its return the punch hammer 101 also resets all the punch bars in their de-energized position. Each selection magnet 98 is on a separate circuit and is energized through the diode matrix 54 when the stepping switch connects a number which requires that circuit to be selected to produce the proper Teletype code.

It is evident that the punch bar selector magnets 98 and the punch hammer magnet 100 cannot operate simultaneously. A slight time delay must be inserted between energizing the selector magnets 98 and operating the punch hammer 101. The perforator has provided for this time delay by use of a "sixth pulse relay" 205. In the application of the perforator to the ASPDE, a further time delay is necessary in order to assure proper positioning of the scanning switch 52 before punching. This is accomplished by relay 103. The action of the scanning switch is controlled by break contacts 104. The break contacts 104 are closed when the punch hammer 101 is de-energized and 110 volts D. C. is applied to the stepping switches through the normally closed contacts of relays 94 and 96. The stepping switches are "cocked" but remain on a position when voltage is applied and step forward when voltage is removed. The operation of the perforator 56 is therefore as follows: The stepping switch 52 steps up to a new position as the punch hammer 101 begins to return to its de-energized position and the break contacts 104 close. As soon as the stepping switch reaches a new position the proper punch bar selector magnets 98 (A, B, C, D, or E) are energized and are positioned under the punch shafts 102. At the same time that voltage is applied to the stepping switches, voltage is applied to relay 103, which is in parallel with the stepping switch coils 108, 109. Relay switch 111 will only close when enough voltage is applied to cock the stepping switches and when closed, voltage is applied to the sixth pulse relay 205 in the perforator. The closure of sixth pulse relay switch contact 105 applies voltage to the punch hammer magnet 100 and the punch hammer 101 operates to punch the tape. As the punch hammer reaches the top of its punching operation, it operates the break contacts 104 which removes voltage from the stepping switches and relay 103. Relay 103 actuates contact 111 to remove voltage from the sixth pulse relay 205 and therefore de-energizes the punch hammer magnet 100. As soon as voltage is removed from the stepping switches they step forward. As the punch hammer 101 drops, the break contacts 104 are closed and the operation begins again.

In order to time the reading interval, a timing clock motor 92 is used to switch the various circuits necessary to start a timing operation. This timing clock motor drives three adjustable cams 112, 113, and 114, each of which operates a single pole, double throw micro switch. Each cam is adjustable as to the length of time of its switching operation and also to its time of operation respective to the other cams. One switch 116 is used to switch the 24 volt supply from the "digitizer" solenoids 76, which are energized when not reading, to the relays 64, 68, 72 in the ASPDE. The second switch 117 is used to apply the necessary 110 volts D. C. to the stepping switches and punch hammer in the ASPDE. The third switch 91 is used to produce one pulse to start the reading operation. These operations will be discussed more fully in the description of the reading operation.

The power supply used in the ASPDE is a standard selenium bridge rectifier 118 utilizing a specially wound 110 volts A. C. to 160 volts A. C. transformer 119 and two selenium bridge connected rectifiers 121. This provides 110 volt D. C. unfiltered output. No filtering is necessary in the power supply. A voltage bleeder 122 provides the 24 volts D. C. Voltage surge suppressors 208 and 209 are placed in the 24 volt and 110 volt circuits respectively to protect the coils from damage.

*Operating sequence*

The actual operating sequence of the ASPDE will now be described. It will be assumed that the equipment is in its non reading mode. At that time there is no voltage applied to the ASPDE. 24 volts is applied to the solenoids 76 in the "digitizer" so that the brushes are held off of the reading discs on the shaft under obervation. This insures no brush wear in the "digitizer." The timing clock motor 92 drives the timing switches and when the time arrives to take a reading, timing switch 116 transfers this 24 volts from the "digitizer" solenoids 76 to the relays 58, 64, 68, 72 in the ASPDE. When the 24 volts is removed from the "digitizer" the brushes contact the reading discs and the "digitizer" is ready for a read out. Relays 64, 68, 72, and the digitalizing relay 58 are energized if the read out consists of numbers which require these relays to be energized. Relays 94 and 96 are energized, the 24 volts necessary being applied to the relays, through the off normal switches 83, 84 of the stepping switches through timing switch 91 to the ground. Since the stepping switches are in their *k* position, the off normal switches 83, 84 are in operation and the circuit is complete. A moment after switch 116 applies the 24 volts to the ASPDE, switch 117 applies 110 volts D. C. to the ASPDE. Since relays 94 and 96 are energized, the 110 volts are not applied to the scanning switch coils 108, 109 relay 103, and the punch hammer magnet 100, and the system still remains inoperative. A moment after the 110 volts is applied, timing switch 91 operates and breaks the path of relays 94 and 96 to ground. This applies voltage to the stepping switches and cocks them. The de-energizing of 94 and 96 also applies voltage to relay 103. This energizes coil 103 to close contact 111 which completes the 24 volt circuit through sixth sense pulse relay 205 to close contacts 105. Closing of contact 105 completes the 110 volt circuit from contacts 206, 207 and energizes the punch hammer magnet 100. The punch hammer 101 moves up and punches the symbol "carriage return." As the punch hammer reaches the top of its swing, it operates the break contacts 104 and the scanning switches step from their eleventh position *k* to their first position *a*. This causes the off normal switches 83, 84 to operate and break the path from 94 and 96 to timing switch 91. At any time between this operation and the arrival of the stepping switches to the eleventh position *k*, timing switch 91 again closes the path from the off normal switches 83, 84 to ground. The operation of the off normal switches also energizes relay 123 which now provides a closed circuit external to the ASPDE which operates a relay in the equipment being read so that the servo being read is stopped. The scanning switches in their first position *a* read the symbol "figure shift" and then step on to the second position *b*, the *c*, *d*, etc. As explained before the perforator in punching steps the scanning switches to their next position. When the scanning switches reach position *j*, the symbol for "line feed" is punched on the tape and the scanning switches step up to the eleventh position *k*. When the scanning switches reach the eleventh position, the off normal switches 83, 84 are operated and since timing switch 91 is now returned to its normally closed position, relays 94 and 96 are energized and remove D. C. voltage from the perforator 56 and the scanning switch coils 108, 109. This occurs before the scanning switches are cocked forward by the perforator and therefore the scanning switches will come to rest on position *k*. As soon as the scanning switches reach the eleventh position *k*, relay 123 is de-energized and the servo system is free to move. After the reading operation is complete, timing switches 116 and 117 operate thus removing all voltages from the ASPDE and energizing the "digitizer" solenoids 76 which pull the brushes away from the reading discs. Switches 124 and 126 are provided for manual operation by bypassing the timing switches.

The model just described of the ASPDE has been designed to do a particular reading operation, reading every six minutes of a shaft position up to 999.9 revolutions. It records data requiring only 10 individual digits in each piece of data. However, with very little modification, the ASPDE can be adapted to many other reading requirements. For example, a digitizer may be used which will read to the hundredth of a revolution or one which will read up to 99,999.9 revolutions. It is only necessary to bring the decades from such a "digitizer" into their proper position on the scanning switch in order to adapt the ASPDE to some other model of "digitizer." It is also possible to modify the ASPDE to punch more than 10 digits by simply substituting stepping switchs of more than 10 positions for those presently used in the scanning switch. Stepping switches with 50 positions which would allow a total of 50 digits to be punched in making a reading might be used. If it is desired to read more than one shaft position, it is only necessary to use a "digitizer" for each shaft position and feed the output to the scanning switch. It is possible to take a reading as often as every 5 seconds by changing the gears in the clock motor.

Since the ASPDE converts digital information to Teletype code after scanning it is possible to utilize very simple means for obtaining other information which occurs in a digital form. For example, a count of the number of readings can be obtained by using a bank of "Ledex" rotary solenoids. These solenoids rotate a one pole, ten position rotary switch one step for every pulse of energy they receive. There is an arrangement for carry over so that one solenoid steps once for every ten steps of the preceding unit. Thus by taking the individual contacts into the proper banks of the scanning switch and grounding the common contact a reading of the solenoids is punched on the tape. Relay 123 can be changed to a double pole, double throw relay to provide a pulse to the solenoids every time a scan is completed. This count could also be accomplished with one bank, 10 position stepping switches. Three switches produce a count up to 1,000, four produce a count up to 10,000, etc. There are various ways to punch the time on the tape. One method would be to use another "digitizer" to read the shaft position of a clock motor. If the time of reading occurs at a standard interval, a modification of a "digitizer" employing only one brush read out could be employed since the shaft position at reading would be at some set point and positioning would not be a problem.

Obviously many modifications and variations of the present invention are possible in the light of the above teachings. It is therefore to be understood that within the scope of the appended claims the invention may be practiced otherwise than as specifically described.

What is claimed is:

1. In an automatic shaft position data encoder, in combination, a shaft, a shaft-position-to-digital-code transducer attached to said shaft, said transducer having means responsive to the position of said shaft for intermittently indicating the shaft position in digital form, said transducer having a plurality of outlets, a master scanning switch connected to said outlets, a matrix coder coupled to the output of said scanning switch for converting electrical pulses received from said switch in digital form into Teletype code pulse form, and a Teletype tape perforator means coupled to said coder to receive said code pulses, said performator means having punching means for punching recording tape in response to the Teletype code pulses received from said coder, and means responsive to movement of said punching means for intermittently stepping said scanning switch whereby said outlets are sequentially scanned.

2. The combination as in claim 1, said transducer outlets being grouped into a plurality of decades, a pair of brushes for each decade geared to said shaft in a predetermined ratio, and means for selecting one brush of each pair for contacting one of said outlets in reading operation in accordance with the reading of the next least decade by said scanning switch for insuring an unambiguous reading of said shaft position, and means for breaking contact of said brushes and outlets when a reading is not being taken.

3. The combination as in claim 2, said master scanning switch including stepping switches, means for synchronizing said stepping switches, said brush selecting means comprising relays connected between said transducer and said stepping switches.

4. The combination as in claim 1, and including means for stopping the movement of said shaft until a reading has been completed and said punching means has been actuated.

5. The combination as in claim 1, said punching means comprising figure shift, data run identification, carriage run, line feed and numerical shaft revolution data elements, said switch having a position for respectively energizing each of said elements through the intermediary of said matrix coder.

6. The combination as in claim 1, said transducer including brushes geared to said shaft in a predetermined ratio in contact with said outlets for breaking contact of said brushes with said outlets, and solenoid means relays connected between said transducer and said scanning switch, relay means synchronizing the movement of stepping switches included in said scanning switch, a first timing means for actuating a switch for transferring voltage from said brush actuating solenoid means in said transducer to said relays and said relay means, coils connecting said switch to said coder, said perforator means including a punch hammer magnet and a plurality of punch bar selections magnets, delay coil means for delaying the energization of said punch hammer magnet until after energization of the selected punch bar magnet, a second timing means set to operate after said first timing means to thereafter apply voltage to said connecting coils and said delay coil means, a third timing means set to thereafter stop the energization of the stepping switch synchronization relay means and to produce the pulse that starts the reading operation of said scanning switch and stops the rotation of said shaft.

7. The combination as in claim 1, said coder to switch coupling comprising diode means for isolating a selected circuit within said scanning switch and said code pulse form comprises a five channel Teletype code form.

8. The combination as in claim 1, in which said Teletype perforator means is magnetically operated at a speed controlled by the stepping rate of said scanning switch, said perforator means including a punch hammer driven by a punch hammer magnet, a plurality of punch bars resting on said hammer, a code punch shaft, each bar having a selection magnet, said perforator means including means responsive to said code form pulses for selecting and energizing one of said selection magnets, wherein said one magnet, when actuated, moves the selected punch bar in line with said code punch shaft which punches the tape, and means for delaying the energization of said punch hammer magnet until said punch bar selection magnet has been actuated.

References Cited in the file of this patent

UNITED STATES PATENTS

| | | |
|---|---|---|
| 1,987,342 | Knutson | Jan. 8, 1935 |
| 2,165,237 | Doty | July 11, 1939 |
| 2,207,743 | Larson et al. | July 16, 1940 |
| 2,343,414 | Johnson | Mar. 7, 1944 |
| 2,666,912 | Gow et al. | Jan. 19, 1954 |